United States Patent
Szoczei et al.

(10) Patent No.: US 8,250,488 B2
(45) Date of Patent: Aug. 21, 2012

(54) METHOD FOR CONTROLLING POSITION INDICATOR OF CURVED SLIDER

(75) Inventors: Steven Mark Szoczei, Ottawa (CA); Pascal Becheiraz, Gatineau (CA)

(73) Assignee: Corel Corporation, Ottawa, Ontario (CA)

( * ) Notice: Subject to any disclaimer, the term of this patent is extended or adjusted under 35 U.S.C. 154(b) by 219 days.

(21) Appl. No.: 12/605,735

(22) Filed: Oct. 26, 2009

(65) Prior Publication Data

US 2010/0185983 A1    Jul. 22, 2010

Related U.S. Application Data

(60) Provisional application No. 61/145,488, filed on Jan. 16, 2009.

(51) Int. Cl.
*G06F 3/048* (2006.01)
(52) U.S. Cl. ......................... 715/833; 715/862
(58) Field of Classification Search .......... 715/833–834, 715/862, 974, 808, 810, 830, 964
See application file for complete search history.

(56) References Cited

U.S. PATENT DOCUMENTS

| | | | | |
|---|---|---|---|---|
| 5,511,157 | A * | 4/1996 | Wang | 345/652 |
| 6,542,171 | B1 * | 4/2003 | Satou et al. | 715/833 |
| 2004/0212605 | A1 * | 10/2004 | Fitzmaurice et al. | 345/184 |
| 2005/0262451 | A1 * | 11/2005 | Remignanti et al. | 715/833 |

OTHER PUBLICATIONS

Stroman, James et al., Administrative Assistant's & Secretary's Handbook, 2nd edition, ISBN-13: 978-0-8144-0913-8, copyright 2008, pp. 138 & 147.*

Institute of Electical and Electronics Engineers, IEEE Standard 100, The Authoritative Dictionary of IEEE Standards Terms, 7th edition, copyright 2000, pp. 48, 261, and 842.*

* cited by examiner

*Primary Examiner* — Doon Chow
*Assistant Examiner* — Wilson Varga
(74) *Attorney, Agent, or Firm* — Patterson & Sheridan, LLP (57) ABSTRACT

The presently disclosed technology provides curved slider GUIs with user interface sensitivity independent from a distance between a cursor and a radial center of the curved slider on a display. An area of operation is defined by an area between parallel bounds oriented equidistant from a radial center of a curved slider and extending from the outermost limits of the curved slider in both directions. Because of the geometry of the area of operation, a distance required to operate an entire range of the curved slider is independent from a distance between the cursor and the radial center of the curved slider. Since a distance that the cursor moves on the display often directly corresponds to movement of a physical input device, the presently disclosed technology results in a more intuitive operation of curved slider because the physical input motions more directly correlate to movements of the curved slider.

23 Claims, 6 Drawing Sheets

METHOD FOR CONTROLLING POSITION INDICATOR OF CURVED SLIDER

CROSS REFERENCE

This application claims the benefit of U.S. Provisional Application No. 61/145,488 filed Jan. 16, 2009 entitled "Curved Slider Control," the content of which is hereby incorporated by reference in its entirety.

BACKGROUND

Many computer systems have graphical user interfaces (GUIs) through which an operating system and application software functionality is accessed. The GUIs can represent computer application programs, documents, and data files as graphically displayed GUI objects, such as icons and menus. Further, the GUI objects can be manipulated by a user to control and activate system and application functions. The user may manipulate GUI objects by means of an input device such as a mouse, keyboard, touch screen, etc. Microsoft Windows® and Apple Macintosh MacOS® operating systems are examples of common GUI-based computer operating systems that support GUI-based applications.

A well-designed GUI interface can facilitate a user's understanding and use of a software application. Some GUI objects, such as icons, can include a picture or other characteristic that is intended to suggest a function associated with the GUI object. Such function-suggesting GUI objects can assist a user in learning and operating a software application. For example, to remind a user how to access paintbrush functionality, a drawing application can use an icon bearing a picture of a paintbrush.

Groupings of GUIs with similar functions are often used in menus and/or control panels with an overall function. For example, a drawing tools menu may include a paintbrush tool, a pencil tool, and a crayon tool. Further, some GUIs in a control panel take the form of slider controls for accessing an adjustable software feature such as contrast, brightness, and transparency. Further, some control panels are circular and have slider controls arranged in a semi-circular fashion within the circular control panel. However, some circular slider controls are difficult for a user to manipulate.

SUMMARY

The presently disclosed technology provides curved slider GUIs with user interface sensitivity independent of the distance between a cursor and a radial center of the curved slider on a display. An area of operation is defined by an area between bounds corresponding to parallel lines oriented equidistant from a radial center of a curved slider GUI and extending from the outermost limits of the curved slider GUI in both directions. Because of the geometry of the area of operation, a sensitivity of the curved slider GUI is independent from a distance between the cursor and the radial center of the curved slider GUI. The presently disclosed technology results in a more intuitive operation of curved slider GUIs because the physical input motions more directly correlate to movements of the curved slider GUIs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

The presently disclosed technology is best understood from the following Detailed Description describing various implementations read in connection with the accompanying drawings.

DETAILED DESCRIPTIONS

Figure 1:
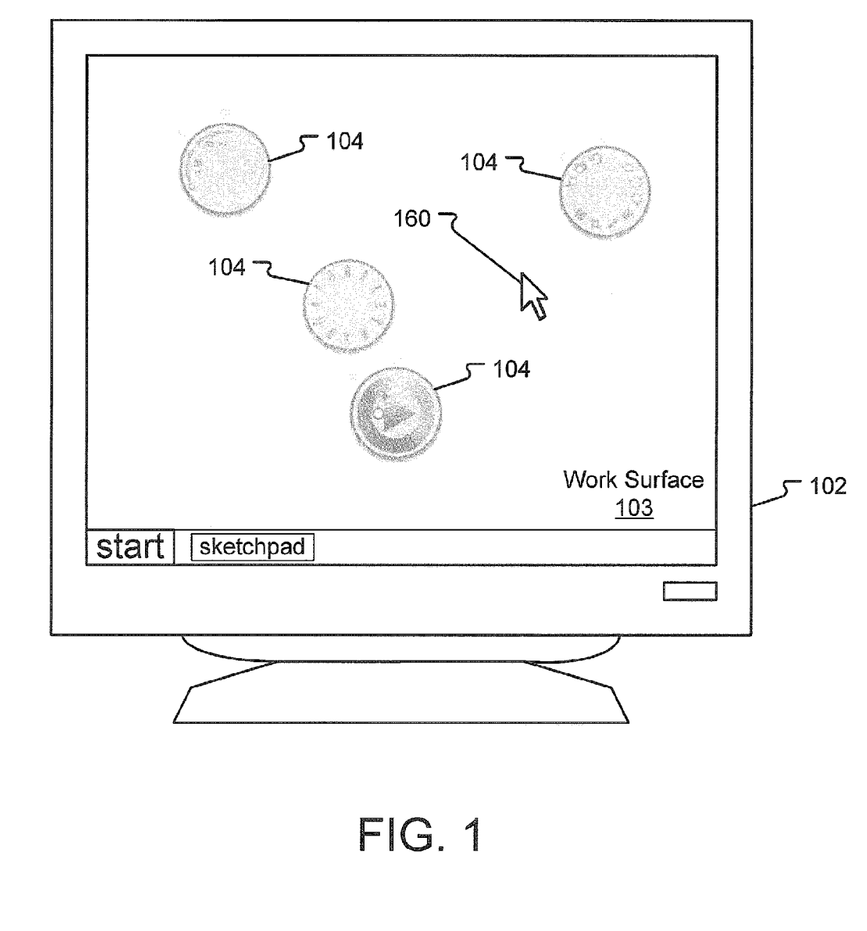
FIG. 1 illustrates a computer monitor displaying example application software that includes four example circular control panels.

FIG. 1 illustrates a computer display 102 displaying four example smart control panels 104. The smart control panels 104 are rendered on a work surface 103 of the computer display 102 along with a cursor 160 that is used to manipulate the smart control panels 104. The smart control panels 104 include curved slider GUIs with user interface sensitivity independent from a distance between the cursor 160 and a radial center of the curved slider on a display (e.g. a computer display or screen 102). The sensitivity independence allows for a more intuitive manipulation of the curved sliders GUIs by a user.

While the curved slider GUIs are discussed with particularity with reference to drawing applications herein, the presently disclosed technology is equally applicable to other types of software applications (e.g. word processing, spreadsheet, database, presentation, internet, and CAD applications). Further, while the curved slider GUIs are discussed with particularity in conjunction with circular control panels herein, the control panels may be any size and shape.

Figure 2:
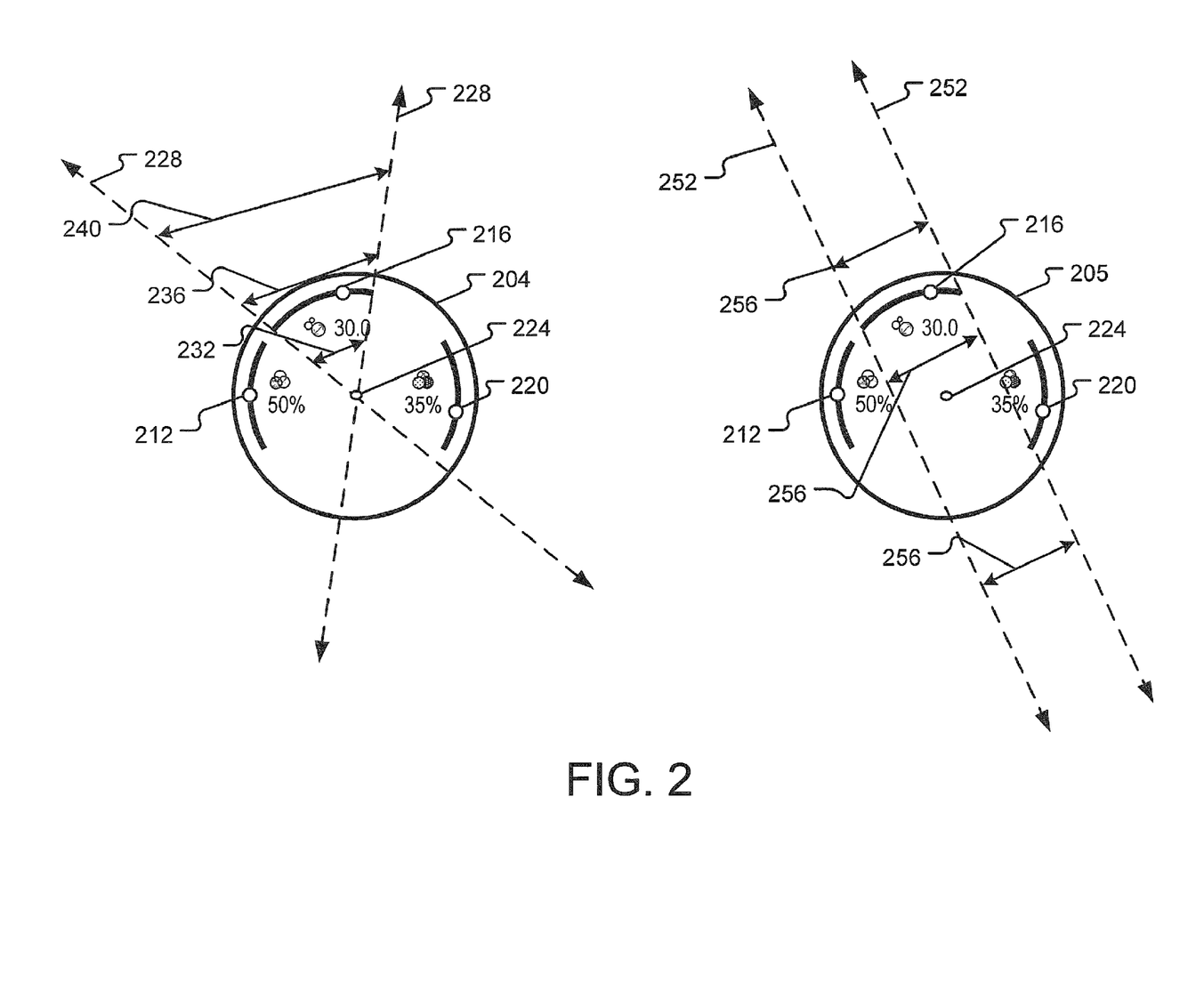
FIG. 2 illustrates two example circular control panels with curved slider GUIs.

FIG. 2 illustrates two example circular control panels 204, 205 with curved slider GUIs 212, 216, and 220. Circular control panels 204, 205 are media settings palettes for a drawing application. Each of the media settings palettes has an opacity slider GUI 212, a size slider GUI 216, and a grain slider GUI 220. The curved slider GUIs 212, 216, and 220 allow a user to adjust the opacity, size, and grain of a selected media (e.g. pencil, chalk, and crayon). The specific orientation and look of the GUIs within the media settings palette is an example only, other orientations are contemplated herein.

The size slider GUI 216 in the left circular control panel 204 is adjustable according to the present state of the art, which is distance-based sensitivity. Distance-based sensitivity means that as a cursor corresponding to a user input device is moved closer to a radial center 224 of the size slider GUI 216 on a display, smaller physical input motions are required to move the size slider GUI 216 a desired amount. Likewise, as the cursor is moved away from the radial center 224 of the size slider GUI 216, greater physical input motions are required to move the size slider GUI 216 the desired amount.

More specifically, a cursor field of operation for adjusting the size slider GUI 216 in the left circular control panel 204 is illustrated by a triangular area bound by lines 228. Lines 228 that corresponding to bounds pass through the radial center 224 of the left circular control panel 204 and continue directly adjacent the outermost limits of the size slider GUI 216. In an alternative implementation, the lines 228 are rays that extend from the radial center 224 and continue directly adjacent the outermost limits of the size slider GUI 216. Because of the geometry of the triangular area, a cursor oriented close to the radial center 224 may only be required to move distance 232 to operate the entire range of the size slider GUI 216. As the cursor is moved away from the radial center 224 of the size slider GUI 216, a distance 236 may be required to operate the entire range of the size slider GUI 216. When the cursor is oriented even further from the radial center 224, distance 240 (which is greater than distance 232 and distance 236) may be required to operate the entire range of the size slider GUI 216.

Since a distance that the cursor moves on a display often directly corresponds to movement of a user input device (e.g. a mouse, trackball, haptic device, touchpad, and electronic drawing tablet), a result of the current state of the art is increased sensitivity of the user input device based on a decreased distance of the cursor from the radial center 224 of the size slider GUI 216 on the display. This may be undesirable when a user wants very fine control of the size slider GUI 216 regardless of the distance of the cursor from the radial center 224 of the size slider GUI 216. Further, the user may desire a consistent motion of the cursor to correspond to consistent movement of the size slider GUI 216.

The presently disclosed technology provides sensitivity independence from a distance between a cursor and a radial center 224 of a size slider GUI 216. Instead of defining the field of cursor operation according to the present state of the art as shown as illustrated by the triangular area bound by lines 228, an area of operation of the size slider GUI 216 of the right circular control panel 205 is defined by an area between bounds corresponding to parallel lines 252 oriented equidistant from the radial center 224 of the size slider GUI 216 and extending from the outermost limits of the size slider GUI 216 in both directions. In alternative implementations, the parallel lines 252 extend only a certain distance or only in one direction from the size slider GUI 216. Because of the geometry of the area of operation for the presently disclosed technology, a distance required to operate the entire range of the size slider GUI 216 is independent from a distance between the cursor and the radial center 224 of the size slider GUI 216. Therefore distances 256 are equal.

In one example implementation, a user orients a cursor over the size slider GUI 216 that the user intends to manipulate. The user then selects the size slider GUI 216 (e.g., by keystroke or mouse button). While the size slider GUI 216 is selected, movement of the cursor within parallel lines 252 results in corresponding movement of the size slider GUI 216. When the size slider GUI 216 is in the desired position, the user deselects the size slider GUI 216 (e.g., by keystroke or mouse button).

In one implementation, the size slider GUI 216 is selected using a mouse by clicking and dragging it to the desired position and deselected by releasing the mouse button. In another implementation, motion of the cursor outside of the parallel lines 252 results in movement of the size slider GUI 216 to an outermost limit that coincides with the closest of the parallel lines 252 to the position of the cursor.

Since a distance that the cursor moves on a display often directly corresponds to movement of a physical input device, the presently disclosed technology results in a more intuitive operation of the size slider GUI 216 because the physical input motions more directly correlate to movements of the size slider GUI 216.

Figure 3:
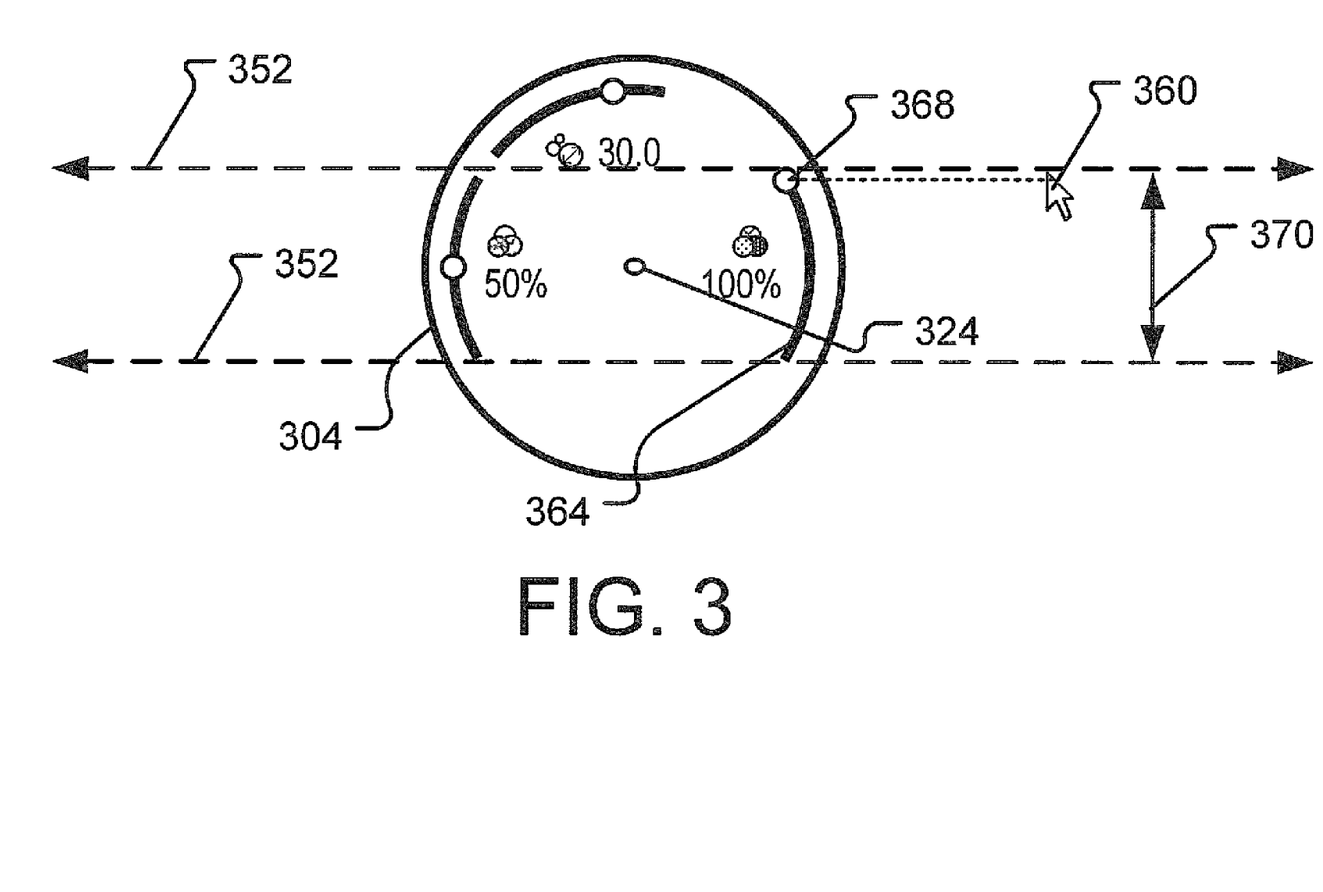
FIG. 3 illustrates an example circular control panel with a cursor corresponding to a first position of curved slider GUI.

FIG. 3 illustrates an example circular control panel 304 with a cursor 360 corresponding to a first position of curved slider GUI 364. The cursor 360 has a vertical orientation that corresponds to the position of the curved slider GUI 364 on the circular control panel 304. Cursor 360 is positioned within an area of operation defined by bounds corresponding to parallel lines 352 oriented equidistant from a radial center 324 of curved slider GUI 364 and extending from the outermost limits of the curved slider GUI 364 in both directions. A position of indicator 368 near the top parallel line 352 corresponds to a position of the cursor 360 located to the right of the control panel 304, near the top parallel line 352. A1

Figure 4:
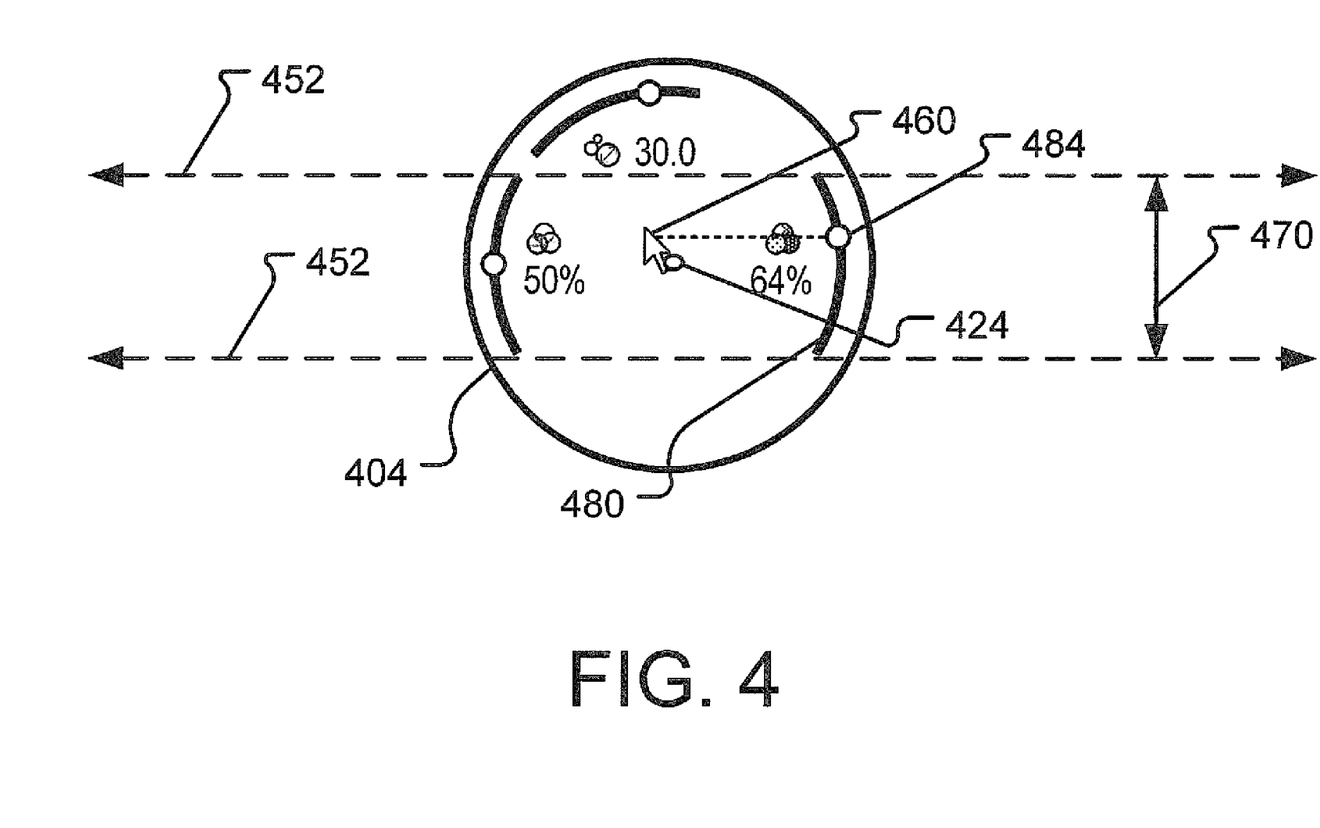
FIG. 4 illustrates an example circular control panel with a cursor corresponding to a second position of curved slider GUI.

FIG. 4 illustrates an example circular control panel 404 with a cursor 460 corresponding to a second position of curved slider GUI 480. Cursor 460 is positioned within an area of operation defined by bounds corresponding to parallel lines 452 oriented equidistant from the radial center 424 of curved slider GUI 480 and extending from the outermost limits of the curved slider GUI 480 in both directions. Similar to FIG. 3, a position of indicator 484 in the upper middle of the area of operation corresponds to a position of the cursor 460 located over the control panel 404, in the upper middle of the area of operation.

Distinctly, unlike curved slider GUIs with distance-based sensitivity, a position correlation of cursor 360 with indicator 368 in FIG. 3 and a position correlation of cursor 460 with indicator 484 in FIG. 4 is dependant only on the position of the cursors 360, 460 in directions 370, 470 perpendicular to parallel lines 352, 452.

In one implementation, a user manipulates a curved slider by selecting a desired indicator with a physical input device (e.g. a mouse, trackball, touchpad) and then moving the physical input device. In an implementation utilizing a mouse as the physical input device, this may be accomplished by clicking-and-dragging the mouse. In other implementations, the curved slider is automatically selected and the user manipulates the curved slider by merely moving the physical input device.

Figure 5:
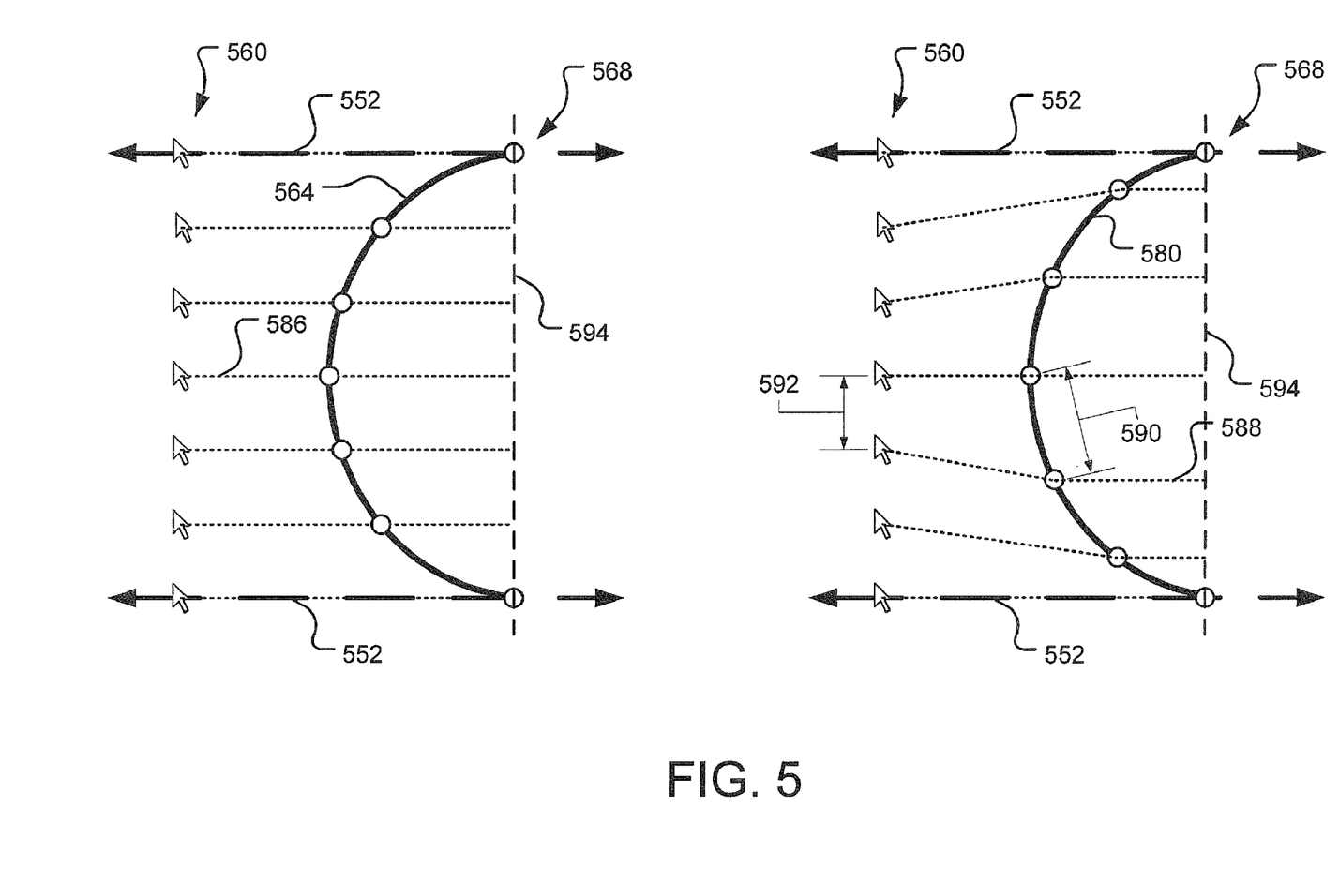
FIG. 5 illustrates two example curved slider GUIs, each with an array of example cursors and corresponding indicators.

FIG. 5 illustrates two example curved slider GUIs 564, 580, each with an array of example cursor positions 560 and corresponding indicator positions 568. Similar to cursors 360 and 460 of FIGS. 3 and 4 respectively, cursor positions 560 are within an area of operation defined by bounds corresponding to parallel lines 552 oriented equidistant from a radial center of each of the curved slider GUIs 564, 580 and extending from the outermost limits of the curved slider GUIs 564, 580 in both directions. Axes 594 are drawn orthogonal to the parallel lines 552 between the outermost limits of the curved slider GUIs 564, 580 to further illustrate the relationship between the cursor positions 560 and the corresponding indicator positions 568.

The left curved slider GUI 564 utilizes an association scheme that links orthogonal movement of a cursor between the two parallel lines 552 linearly to movement of an associated indicator on the curved slider GUI 564 between the two parallel lines 552. As a result, parallel association lines (e.g., association line 586) may be drawn from each cursor position 560 to each associated indicator position 568 on the curved slider GUI 564 and to the axis 594. The linear relationship between movement of the cursor and the indicator is further illustrated by equal distances between intersections of the parallel association lines with the axis 594.

The right curved slider GUI 580 utilizes an association scheme that links a position of a cursor between the two parallel lines 552 to a radial distance of an indicator along the curved slider GUI 580. As a result, orthogonal movement of the cursor between the two parallel lines 552 is non-linearly linked to movement of the indicator on the curved slider GUI 580 between the two parallel lines 552. In the implementation of the right curved slider GUI 580, radial distances (e.g., distance 590) between each of the indicator positions 568 along the curved slider GUI 564 are equal and correspond to equal linear distances (e.g., distance 592) between each of the cursor positions 560. The non-linear relationship between movement of the cursor and the indicator is further illustrated by the un-equal distances between intersections of parallel association lines (e.g., association line 588) with the axis 594. Other schemes that associate a position of a cursor between the two parallel bounds to a position of an indicator on a curved slider GUI are contemplated herein.

In another implementation, an orientation of curved sliders on a control panel is adjustable for a right-handed or left-handed user. For example, when a right-handed user utilizes an electronic drawing tablet for input, curved sliders are more intuitive if they have a radial center located to the right of the curved slider GUI. This is because the pivot point (i.e. wrist) of the user's right-hand when holding a stylus is typically to the right of a contact point of the stylus. Thus, a naturally curved motion of the user's right hand when the user's wrist is resting against the electronic drawing tablet follows the curvature of the curved sliders.

Similarly, when a left-handed user utilizes the electronic drawing tablet for input, curved sliders are more intuitive if they have a radial center located to the left of the curved slider GUI. This is because the pivot point of the user's left-hand when holding the stylus is typically to the left of a contact point of the stylus.

Figure 6:
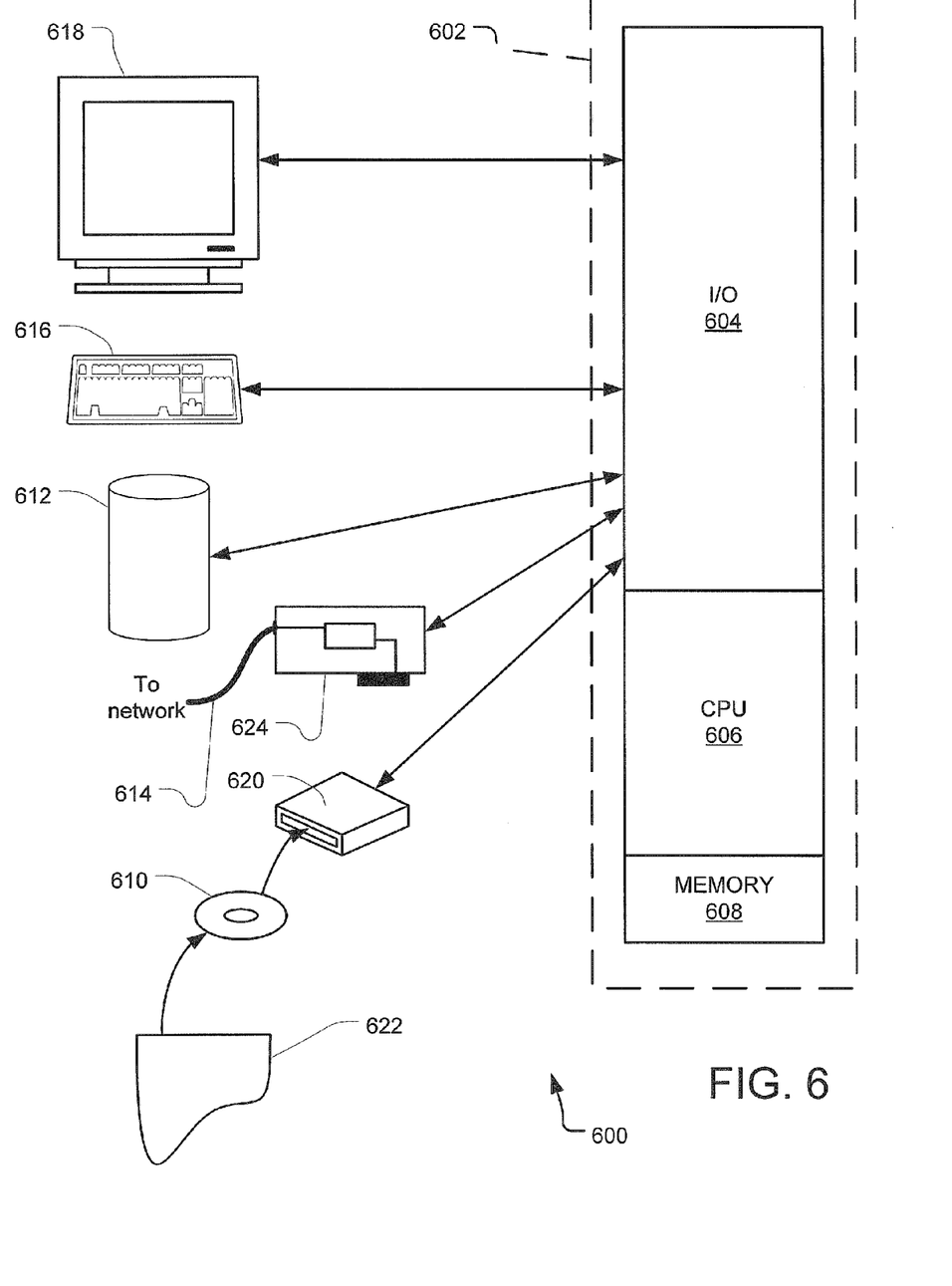
FIG. 6 illustrates an example computing system that can be used to implement the presently disclosed technology.

FIG. 6 illustrates an example computing system that can be used to implement the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an example implementation, control panel modules, curved slider modules, and/or a drawing module, may be incorporated as part of the operating system, application programs, or other program modules. A database containing curved slider modules and/or associated GUIs may be stored as program data in memory 608 or other storage systems, such as disk storage unit 612 or DVD/CD-ROM medium 610.

The present specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

What is claimed:

1. A method of manipulating an indicator on a curved slider, the method comprising:

defining a first bound corresponding to a first line that intersects a first limit of the curved slider and a second bound corresponding to a second line that intersects a second limit of the curved slider, wherein the first bound and the second bound are parallel and equidistant from a radial center of the curved slider;

associating a position of a cursor in a direction orthogonal to the first and second bounds to a position of the indicator on the curved slider where the position of the cursor is not directly on the curved slider; and displaying on a display device the indicator at the position of the indicator on the curved slider.

2. The method of claim 1, wherein the control panel is round.

3. The method of claim 1, wherein a direction of curvature of the curved slider is adjustable for a right-handed or a left-handed user.

4. The method of claim 1, wherein the control panel contains multiple curved sliders.

5. The method of claim 1, wherein the associating operation occurs when the indicator is selected by the cursor.

6. The method of claim 1, wherein the associating operation equates the position of the cursor with the position of the indicator in the direction orthogonal to the first and second bounds.

7. The method of claim 1, wherein there is a linear relationship between movement of the cursor and movement of the indicator on the curved slider.

8. The method of claim 1, wherein a distance of the cursor from one or both of the first and second bounds is equivalent to a distance of the indicator from one or both of the first and second bounds.

9. The method of claim 1, wherein a distance of the cursor from one or both of the first and second bounds is proportional to a distance of the indicator along the curved slider.

10. A system for manipulating an indicator on a curved slider, the system comprising:

a processor; and a memory storing a plurality of modules executed on the processor, the modules including at least:

a definition module configured to define a first bound corresponding to a first line intersecting a first limit of the curved slider and a second bound corresponding to a second line intersecting a second limit of the curved slider, wherein the first bound and the second bound are parallel and equidistant from a radial center of the curved slider, and an association module configured to equate a position of a cursor in a direction orthogonal to the first and second bounds to a position of the indicator on the curved slider where the position of the cursor is not directly on the curved slider; and a display device configured to display the indicator at the position of the indicator on the curved slider.

11. The system of claim 10, wherein the control panel is round.

12. The system of claim 10, wherein a direction of curvature of the curved slider is adjustable for a right-handed or a left-handed user.

13. The system of claim 10, wherein the control panel contains multiple curved sliders.

14. The system of claim 10, wherein the association module operates when the indicator is selected by the cursor.

15. The system of claim 10, wherein there is a linear relationship between movement of the cursor and movement of the indicator on the curved slider.

16. The system of claim 10, wherein a distance of the cursor from one or both of the first and second bounds is equivalent to a distance of the indicator from one or both of the first and second bounds.

17. The system of claim 10, wherein a distance of the cursor from one or both of the first and second bounds is proportional to a distance of the indicator along the curved slider.

18. A method of using a physical input device to manipulate an indicator on a curved slider, the method comprising:

orienting a cursor over the indicator and selecting the indicator;

defining a first bound corresponding to a first line intersecting a first limit of the curved slider and a second bound corresponding to a second line intersecting a second limit of the curved slider, wherein the first bound and the second bound are parallel and equidistant from a radial center of the curved slider; and moving the physical input device at least in a direction orthogonal to the first and second bounds to manipulate the indicator on the curved slider where the position of the cursor is within the bounds of the parallel lines but not directly on the curved slider.

19. The method of claim 18, wherein the selecting operation is accomplished using a computer mouse.

20. The method of claim 18, wherein the selecting operation is accomplished by clicking a computer mouse and the moving operation is accomplished by dragging the computer mouse.

21. The method of claim 18, wherein the control panel is round.

22. The method of claim 18, wherein a direction of curvature of the curved slider is adjustable for a right-handed or a left-handed user.

23. The method of claim 18, wherein the control panel contains multiple curved sliders.

* * * * *